R. G. KENDALL.
Improvement in Milk-Strainers.
No. 128,800.   Patented July 9, 1872.
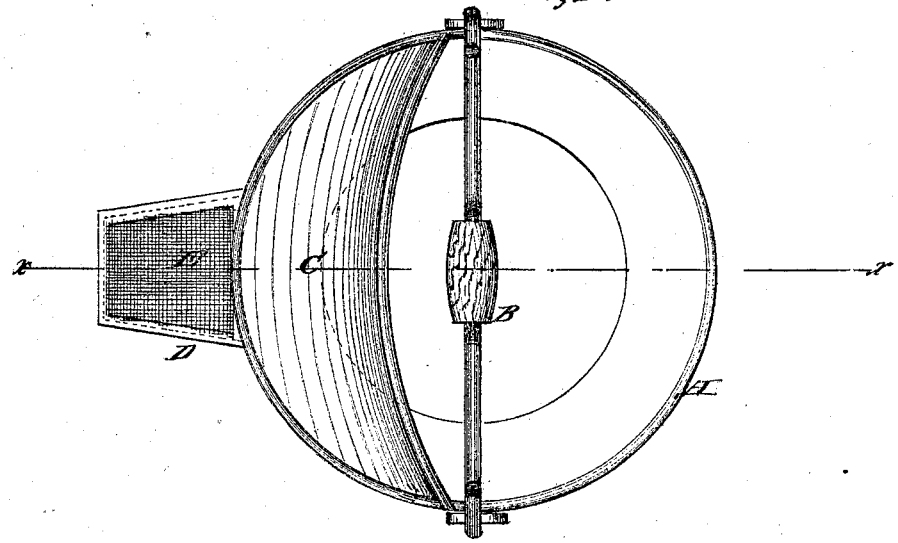
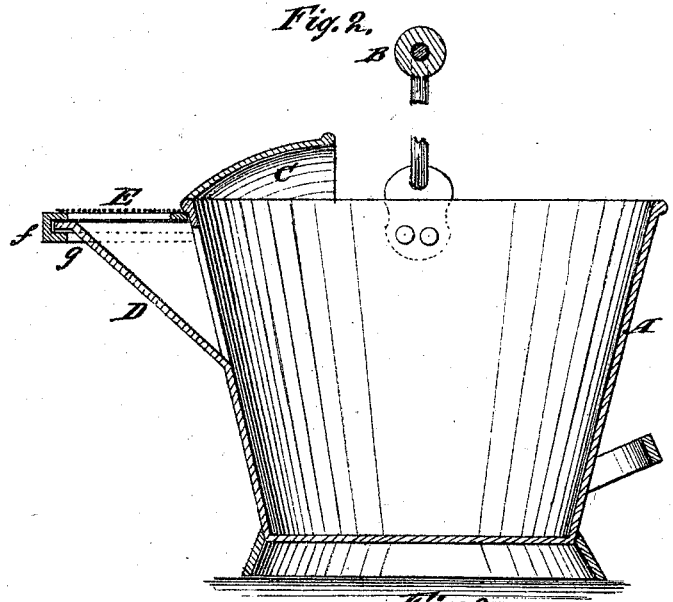
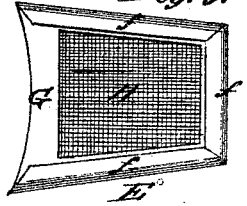

UNITED STATES PATENT OFFICE.

RICHARD G. KENDALL, OF FAIR WEATHER, ILLINOIS.

IMPROVEMENT IN MILK-STRAINERS.

Specification forming part of Letters Patent No. 128,800, dated July 9, 1872.

Specification describing a new and useful Improvement in Milk-Strainer, invented by RICHARD G. KENDALL, of Fair Weather, in the county of Adams and State of Illinois.

This invention relates to a new and useful improvement in milk-straining buckets or pails; and consists in a new mode of making the strainers detachable from the bucket, so that they may be changed or removed with facility.

In the accompanying drawing, Figure 1 is a top view of a milk-bucket or pail to which my strainer is attached. Fig. 2 is a vertical section of Fig. 1 taken on the line $x\ x$. Fig. 3 is a view of the strainer detached, showing its reversed side.

Similar letters of reference indicate corresponding parts.

A is the bucket. B is the bail. C is the guard; and D is the spout, to the top of which the strainer is attached. E is the strainer. The spout D is made with a surrounding flange, $g$, and is narrower at its extremity or point of delivery than where it is connected with the pail. The strainer E consists of a frame, G, of tin or thin metal and the wire-gauze H, the latter being soldered to the frame. A groove, $f$, is formed around the frame to engage with the flange of the spout. The spout and the strainer being constructed in this manner, it will be seen that the strainer can be slipped on to the spout and taken off at will, and a coarser or finer strainer used, or none at all, as may be desired. The groove in the frame of the strainer is formed by turning the metal as for forming a lock or clasp-joint, and the strainer is held in place by the spring of the lip so turned over.

Having thus described my invention, I claim as new and desire to secure by Letters Patent—

A strainer, E, having frame G with groove $f$, fastened detachably on a horizontal lip, $g$, of spout, as and for the purpose described.

RICHARD G. KENDALL.

Witnesses:
FRANCIS M. BEHYMER,
JON. S. MCKINNEY.